Sept. 1, 1936.  H. L. OLESEN  2,053,101
THERMIONIC TUBE TESTING DEVICE
Filed Jan. 2, 1932  5 Sheets-Sheet 1

Inventor:
Harold L. Olesen
By Williams, Bradbury,
McCaleb & Hinkle, Attys.

Sept. 1, 1936.  H. L. OLESEN  2,053,101
THERMIONIC TUBE TESTING DEVICE
Filed Jan. 2, 1932  5 Sheets-Sheet 2
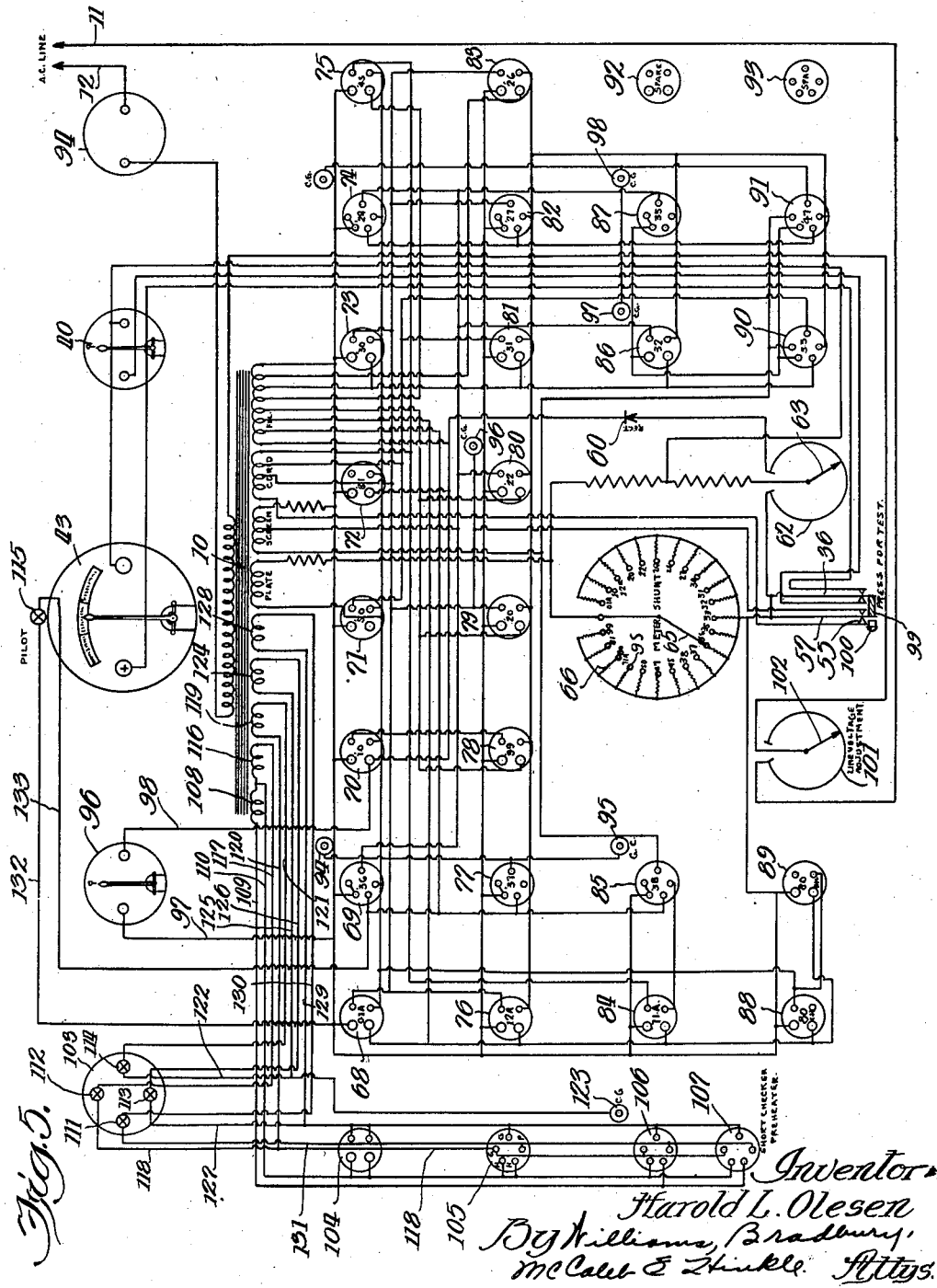

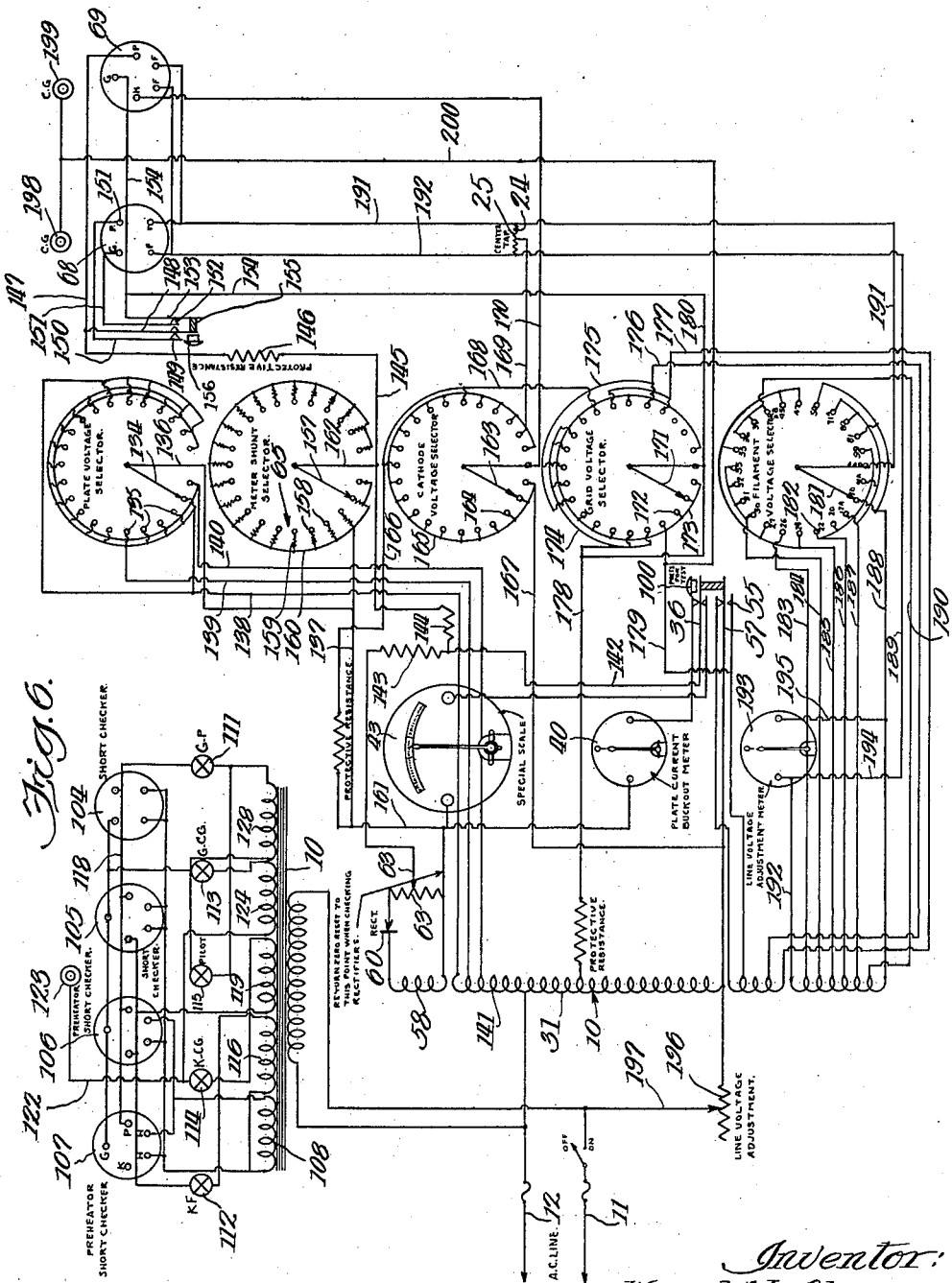

Sept. 1, 1936.    H. L. OLESEN    2,053,101
THERMIONIC TUBE TESTING DEVICE
Filed Jan. 2, 1932    5 Sheets-Sheet 4
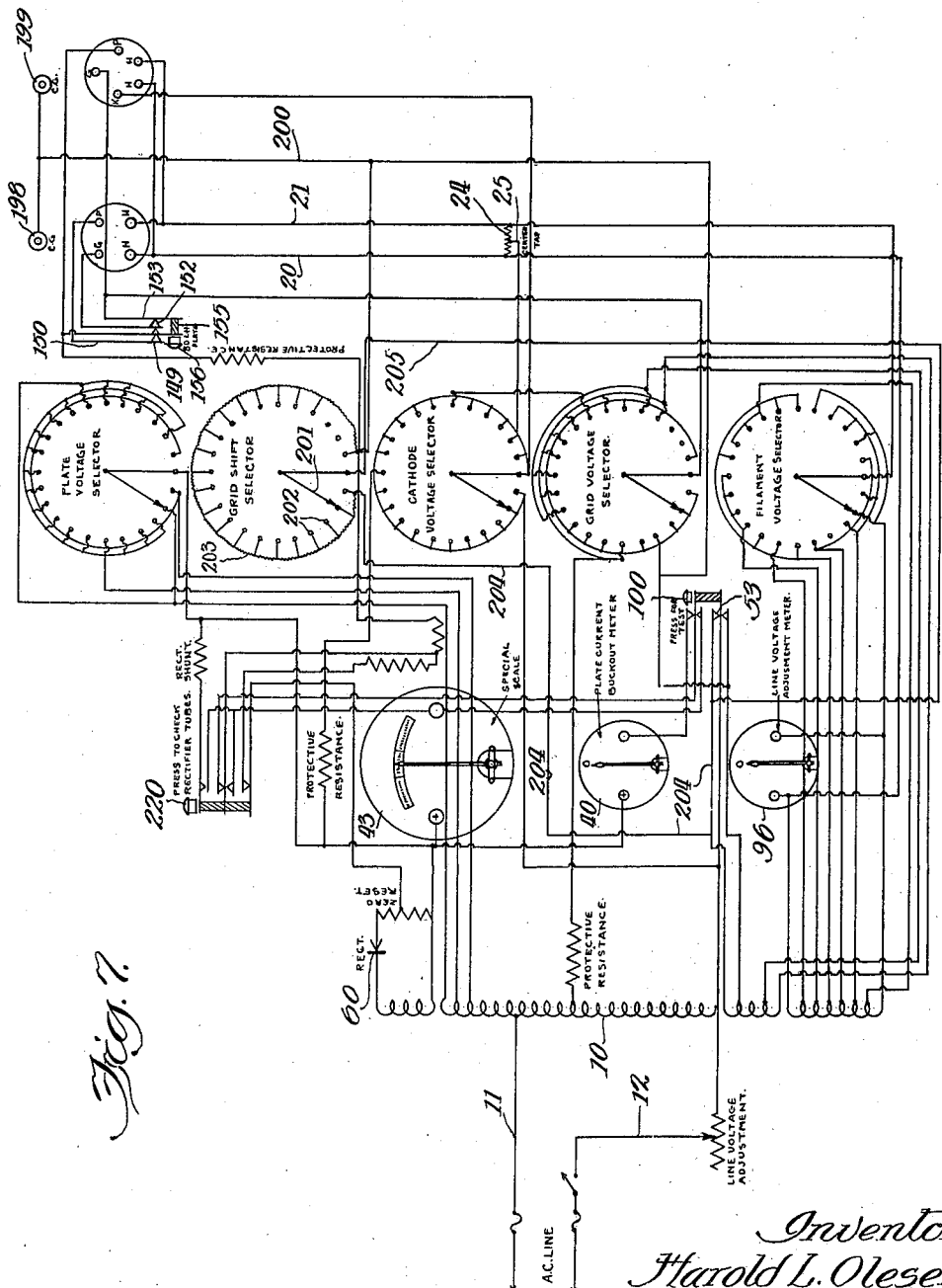

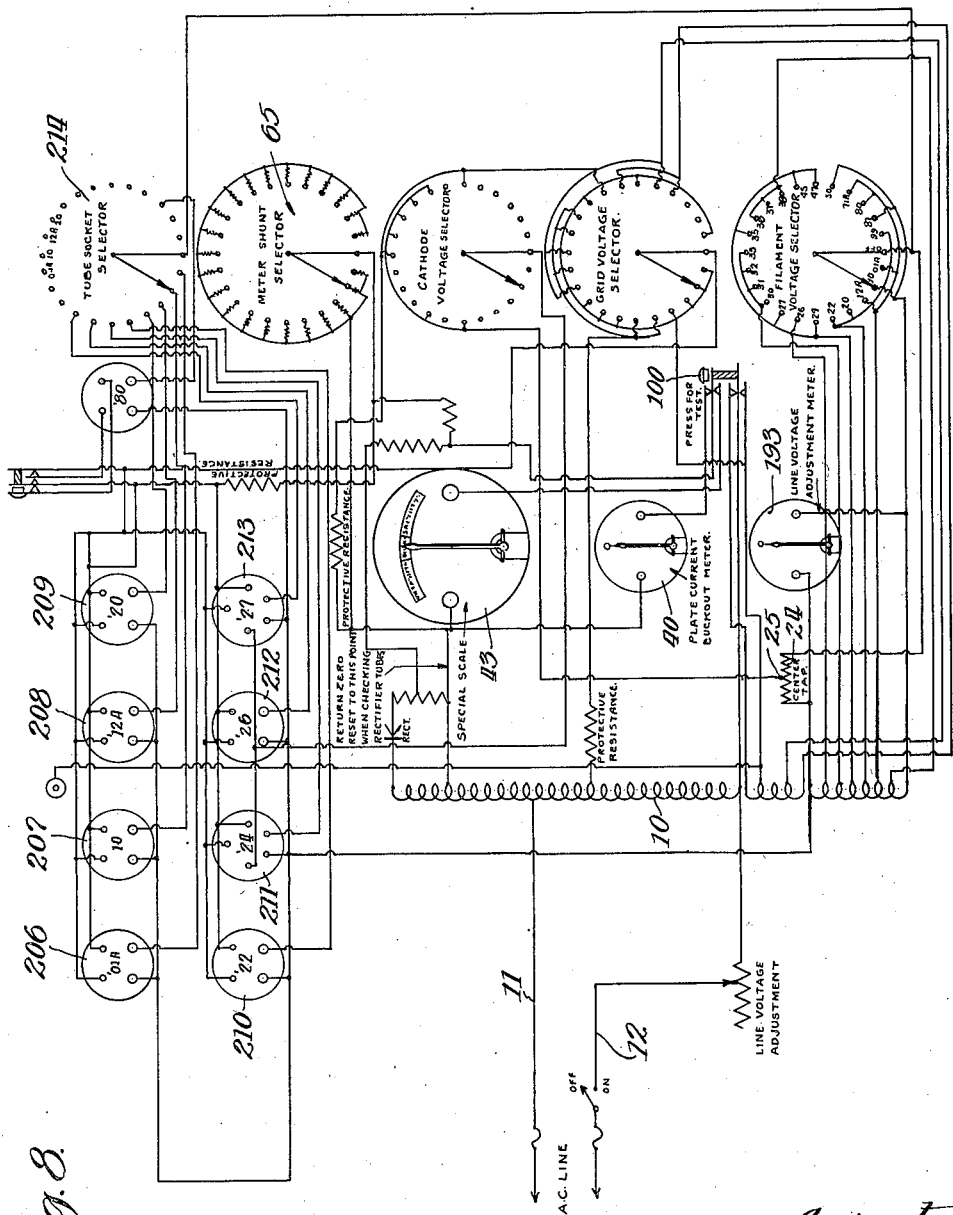

Patented Sept. 1, 1936

2,053,101

UNITED STATES PATENT OFFICE 2,053,101

THERMIONIC TUBE TESTING DEVICE

Harold L. Olesen, Lake Bluff, Ill., assignor to Jewell Electrical Instrument Co., Chicago, Ill., a corporation of New Jersey Application January 2, 1932, Serial No. 584,442

1 Claim. (Cl. 250—27)

The present invention relates to thermionic tube testing devices and is particularly concerned with improved devices for indicating to tube purchasers and others not familiar with the characteristics of tubes whether the tube is of sufficient value to warrant the purchase of a new tube.

The average customer purchasing a tube knows little or nothing about the electrical characteristics of the tube, and values on any type of scale calibrated arbitrarily or directly in units of mutual conductance, mean little or nothing to such a customer.

In the devices of the prior art it has been necessary for the tube dealer to refer to tables of standards which are provided with tube testers for the purpose of ascertaining whether the characteristics of the tube under test are such as to give a satisfactory or an unsatisfactory performance in the average radio set.

Since the customer realizes that the dealer is interested in selling radio tubes, it is difficult for the dealer to secure the confidence of the customer with the devices of the prior art because the customer is likely to feel that the dealer is prejudiced against finding any tube good, since the dealer profits by the sale of another tube.

The disclosure to the customer of the indication on the tester and the table of standards is not convincing, for the reason that the customer does not ordinarily understand tube characteristics, and the devices of the prior art also require adjustments which give the customer the idea that the dealer can make the tube look good or bad by the preliminary adjustments which he makes on the tube tester.

One of the objects of the invention is the provision of an improved thermionic tube testing device which indicates directly to the customer whether the tube is good or bad, or whether the tube is to be classified as satisfactory for use in an average radio set, unsatisfactory or doubtful.

One of the principal features of the present invention is the provision of a tube tester which indicates directly in ordinary language the condition of the tube, and which is adapted to gain the confidence of the customer by causing him to rely upon the integrity of the testing instrument rather than on the representations of the dealer who sells tubes.

Another object of the invention is the provision of a tube tester of the class described, which is adapted to indicate whether a tube is good or bad, the indication being based upon the value of the mutual conductance of the tube being tested. This particular characteristic of vacuum tubes is the best single characteristic of tubes for the purpose of determining whether or not the tubes are satisfactory in radio sets.

Another object of the invention is the provision of an improved tube testing device of the class described, adapted to indicate a mutual conductance characteristic of any of a multiplicity of different tubes on the same instrument with the same scale deflection for a good or bad tube or a "satisfactory, doubtful or unsatisfactory" tube.

Another object of the invention is the provision of an improved tube testing device of the class described, which is adapted to indicate short circuits between the various electrodes of the tube, and which is also adapted to permit the preheating of tubes preliminary to the test without loss of time.

Another object of the invention is the provision of an improved tube testing device of the class described, which is adapted to give a more accurate indication of the value of the tube by virtue of the fact that the meter is adapted to measure only the change in plate current which is induced by a change in grid voltage rather than the full plate current.

Another object of the invention is the provision of a plurality of forms of a directly reading tube testing device, each of which has particular advantages due to its improved structure, and each of which is capable of accomplishing new and useful results in the provision of a more simple and accurate test.

Another object of the invention is the provision of a simplified method of tube testing and a testing device which is simplified in its operation from the viewpoint of the dealer and tube purchaser, so that the prospective purchaser of the tube may witness the test of the tube himself and understand whether the tube is a good tube or a bad tube without the necessity for a knowledge of the characteristics of the tubes.

Other objects and advantages of the invention will be apparent from the following description and accompanying drawings, in which similar characters of reference indicate similar parts throughout the several views.

Referring to the drawings, of which there are five sheets,

Fig. 5 is a wiring diagram of a tube testing device constructed according to the present invention and employing a multiplicity of sockets, including a socket for each type of tube to be tested;

Fig. 6 is a wiring diagram of another modification of the invention, including one of each of the standard forms of socket, and selector switches for adapting the voltage connections of the sockets to the various tubes and for controlling the meter connections to give a constant indication or a single standard of merit for all the different tubes;

Fig. 7 is a wiring diagram of another modification adapted to accomplish the same result in a different manner through the provision of a selector switch adapted to vary the value of the increment of grid voltage used in making the test so that the instrument will give the same indication for all types of tubes;

Fig. 8 is a wiring diagram of another modification which is capable of producing the same results with a different electrical circuit.

Figure 1:
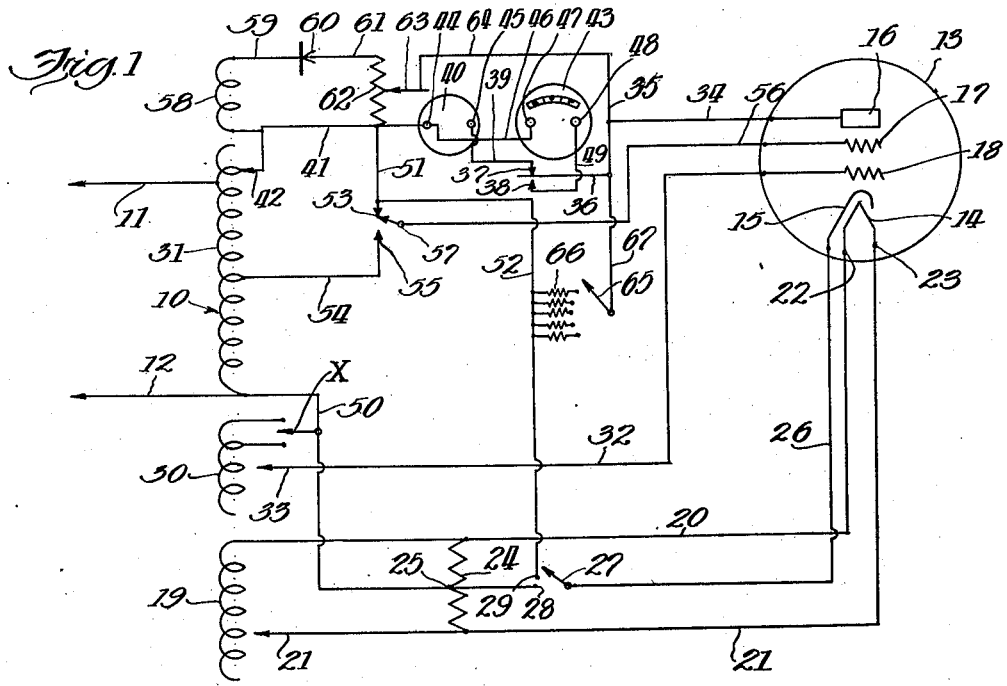
Fig. 1 is a schematic wiring diagram of a simplified tube tester constructed according to the present invention.

Referring to Fig. 1, this is a schematic or simplified diagram of a testing device constructed according to the present invention, which is included for the purpose of facilitating the explanation of the principles of operation.

The tester preferably includes a source of alternating current which may consist of an auto transformer, ordinary transformer with a plurality of secondary taps, or a transformer with a multiplicity of secondary windings indicated diagrammatically by the numeral 10. The primary leads 11, 12 are preferably connected to an ordinary wall socket plug, so that the device may be energized from the 110 volt alternating current lighting circuit.

In some embodiments of the invention the plate and grid or grids or other electrodes may be energized by means of one or more direct current batteries, the filaments being energized by alternating current.

The circle 13 represents a thermionic tube under test and the tube selected as an example is provided with filament 14, cathode 15, plate 16, control grid 17 and one or more auxiliary grids or electrodes 18. It should be understood that the present tester may be adapted to test all kinds of thermionic tubes now on the market, and in some cases the various grids may be used interchangeably.

The transformer winding 19 is adapted to energize the filament 14 and cathode 15. Leads 20, 21 extend from winding 19 to the filament contacts 22, 23. The conductors 20, 21 are joined by an adjustable resistance 24, the center point 25 of which may be connected to the cathode 15 by a conductor 26.

For testing purposes the device may be transformed from a tester for tubes of the type having a separate cathode to a tester for tubes in which the filament is the cathode by connecting the cathode to the filament by means of a switch 27 cooperating with contact 28, or the same result may be accomplished by an adapter having the cathode connected to the filament. When switch 27 is connected to contact 29, cathode 15 is separately energized.

The winding 30 is adapted to energize the electrode 18 which may be the screen grid in screen grid tubes. Screen grid 18 is therefore connected by a conductor 32 to an adjustable tap 33.

The winding 31 is adapted to provide appropriate voltage for the plate and for supplying an increment of additional voltage on the grid to effect a test. In order to place a predetermined voltage on the plate 16, a conductor 34 connects plate 16 with conductor 35.

The tester is preferably provided with a socket for four prong tubes and a socket for five prong tubes with appropriate leads for screen grid tubes or other types of tubes having electrodes connected to special connectors. Any number of sockets may be employed so that there may be a socket for each type of tube or sockets for each group of types of tubes, the sockets being differently energized, if desired.

Conductor 35 is connected with a resilient switch member 36 which is adapted to engage contacts 37, 38, the switch being normally urged into engagement with contact 37. Contact 37 is connected to the conductor with one terminal of a plate current ammeter 40 and the other terminal of the plate current ammeter is connected to conductor 41, which leads to an adjustable tap 42 which is connected to the winding 31.

The meters 40 and 43 comprise ordinary direct current milliammeters, the meter 40 having a range suitable for measurement of the normal plate current of any tube which is to be tested, while the meter 43 is more sensitive and is adapted to measure only the increase in plate current caused by a predetermined change in grid voltage. The meter 43 is the principal indicating meter of the testing device, and it may be provided with any of the dials illustrated in Figs. 2, 3 or 4, so as to give an indication in ordinary words of the value of the tube under test. The scale of meter 43 may also be made of translucent material, illuminated by either white or colored lamps. In some embodiments of the invention the dial may comprise a plurality of scales consisting of segments of different colors having a plurality of concentric scales with scale divisions of different size if desired.

The terminal 44 of meter 40 is connected by a conductor 46 to terminal 47 of meter 43. Terminal 48 of meter 43 is connected by conductor 49 to contact 38. By tracing the circuit from the plate as follows: 16, 34, 35, 36, 37, 39, 45, 40, 44, 41, it will be found that the meter 40 is normally in the plate circuit and adapted to indicate the plate current when the tube is energized, but by pressing a button and actuating switch 36, the circuit is broken at the contact 37 and made with the contact 38, cutting out the meter 40 and simultaneously cutting in the meter 43 for a purpose further to be described.

The plate-filament circuit is completed by a conductor 50 which extends from the winding 31 to the center point 25 of resistance 24, or under other conditions the circuit may be completed through conductors 51, 52 which lead to the contact 29 and may be connected by means of switch 27 and conductor 26 to cathode 15. Under these conditions the electrode which is usually connected to the cathode prong, becomes the screen grid of a pentode type tube.

The conductor 51 leads from conductor 41 to a fixed contact 53. Conductor 54 leads from a tap on the winding 31 to a fixed contact 55. Control grid 17 is connected by conductor 56 to a resilient switch member 57 which is normally urged into engagement with contact 53. The screen grid 17 is thus normally energized from winding 31 through the conductors 42, 41, 51, 53, 57, 56; but on pressing the switch 57 connection is broken in the contact 53 and made at contact 55, energizing the screen grid 17 through conductor 54 leading from the winding 31. The switch X may be used to change the grid voltage by supplying an additional increment of grid voltage or connecting the grid to different spaced points in the energizing circuit.

It is thus possible to produce a predetermined change in grid voltage after the tube has been energized, which will produce a corresponding change in plate current, the change in plate current being a measure of the mutual conductance of the tube.

In order to simplify the measurement of the value of the tube, the transformer 10 is preferably provided with windings 58, one end of which is connected by conductor 42 to the winding 31. The same end is connected by conductor 41 to the plate circuit. The opposite end of the winding 58 is connected by conductor 59 to a current rectifier such as a copper oxide rectifier disk 60, the other side of which is connected by conductor 61 to a rheostat 62.

The other end of the rheostat 62 is connected to conductor 41, and an adjustable contact arm 63 of the rheostat is connected by conductor 64 to conductor 35 and thence through conductor 34 to the plate 16. The winding 58, rectifier 60 and rheostat 62 provide a source of direct current, the effective voltage of which may be determined by the location of the rheostat arm 63 and the circuit through the rheostat 62 and conductor 64 constitutes a circuit in parallel with but of opposed polarity to the usual plate circuit.

The meter 40 is preferably a milliammeter with a zero center scale. In some embodiments of the invention scale divisions may be included for directly indicating the normal plate current, but in other embodiments it is only necessary to provide the zero center point to which the needle should be adjusted by means of the rheostat 62, 63 to carry out the test.

The meter 43 preferably comprises an ordinary milliammeter of proper range to measure the increment of plate current which is produced by the change in control grid voltage and it is preferably provided with a dial having indicia for directly indicating to the customer whether the tube is good or bad.

Figure 2:
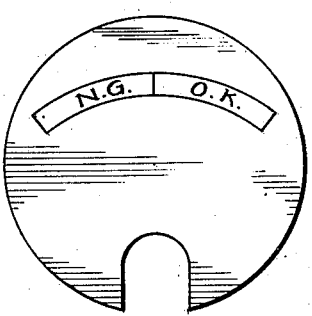
Fig. 2 is a plan view of the present meter scale of one form of the invention.
Figure 3:
Fig. 3 is a similar view of a modified form of meter scale.

In some embodiments of the invention the words "good" or "bad" may be used or, as shown in Fig. 2, the notation "N. G." means "no good", while the notation "O. K." means the tube is good. The other equivalent legends are "unsatisfactory" and "satisfactory", as shown in Fig. 3, depending upon the amount of positiveness preferred in expressing the value or lack of value of the tube.

Figure 4:
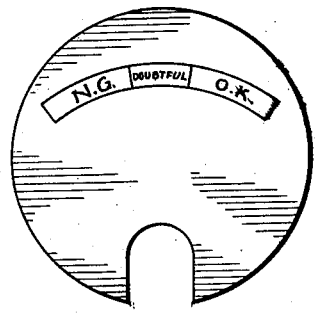
Fig. 4 is a similar view of another form of meter scale.

It should be understood that, as measured in terms of mutual conductance, tubes may vary all the way from a very good tube to a very poor tube, and consequently it is also desirable to provide a scale of the type of Fig. 4 in which the notations are "N. G.", "doubtful", "O. K."

This takes care of the practical possibility that some tubes will fall within the range between the classification of unsatisfactory and satisfactory, and in such cases the dealer may find it most desirable to state frankly to the prospective purchaser that the tube is not positively a bad tube, but it has deteriorated to such an extent that its further usefulness is doubtful, or that it may only give him fair service in his radio receiving set for a relatively short period of time, after which a new tube will have to be purchased.

It will be noted that the favorable indicia is placed at the right hand of the scale, since the normal position of the needle is at the left extremity of the scale and the greater the deflection of the needle the greater the mutual conductance of the tube and the more favorable is the indication of the value of the tube.

The operation of the tester so far described is as follows. A tube is placed in the socket 13 and it is energized by means of the transformer 10, since the contacts of the socket 13 are connected to the transformer in such manner as to provide appropriate voltage for each element of the tube.

This will cause the meter 40 to read off center on account of the plate current flowing in the plate circuit during one half the alternating current cycle, the tube itself acting as a rectifier and permitting plate current to flow half the time.

By means of the rheostats 62, 63 the rectifying circuit may be so adjusted that an equal and opposite current flows through the conductor 64 opposing the current in the plate circuit through the meter 40, and the resultant current in the meter 40 being the sum of two equal and opposite currents, may be reduced to zero. The rheostats 62, 63 should, therefore, be adjusted so that the needle of the meter 40 is returned to a predetermined point. It should be noted, however, that the tube in the socket 13 is still normally energized under conditions suitable for operation or test.

The switch "X" may then be actuated to change the input or control grid voltage and the switch 36 may be actuated to cut out the meter 40 and cut in the meter 43. These switches are preferably controlled by a common actuating member such as a push button and the circuit is thus simultaneously changed to effect a grid test and connect the meter to measure the change in plate current.

The meter 43 is of similar characteristics to the meter 40 in so far as impedance is concerned, and its substitution in the circuit does not unbalance the circuit conditions. The meter 43 will, however, indicate the increase in plate current only and the position of the needle will determine whether the tube is unsatisfactory, satisfactory or doubtful.

It will be evident that the characteristics of the circuits and meters may be made such that any tube falling below a given standard of mutual conductance will be indicated as unsatisfactory, but the various different tubes have entirely different electrical characteristics and consequently the mutual conductance of other tubes will be more or less.

One of the most important features of the present invention is the measurement of the value of various different kinds of tubes according to a single standard and consequently the meters 40, 43 are preferably provided with means for changing the characteristics of the circuit in such manner as to permit the adjustment of the circuit for any particular tube, so that a good tube will give the same indication on the scale of the meter 43, and a poor tube of one type will give the same indication of a poor tube of another type.

One form of means for accomplishing this result is shown in Fig. 1, and comprises a selector switch 65 adapted to cooperate with a plurality of shunts 66. The common terminal of the shunts 66 is connected to conductor 52, which leads to the common terminals 44, 47 of both meters. The movable switch arm 65 is connected by a conductor 67 to conductor 35 and switch 36, which is in connection with one side of either meter depending on the position of the switch. The shunts 66 are adapted to cooperate with either of the meters 40, 43 in such manner that the indication on the meter 43 is reduced or increased to a common standard.

By regulating the resistance of the shunts 66, tubes of entirely different types may be made to give the same indication on the meter 43. The selector switch 65 is, of course, provided with the appropriate indicia to designate the type of tube, such as the type number of the tube. It is possible, therefore, by setting the switch arm 65 at the proper point to test a tube of a type having a high mutual conductance, or a tube of a different type having a low mutual conductance, and the reading on the meter 43 will be designated as unsatisfactory or satisfactory for that particular type of tube.

Since different tubes must be applied with different voltages, appropriate adjustment may be made by means of the adjustable taps or contact arms 42, 33, 21, or the testing device may be provided with a multiplicity of different sockets, each connected by appropriate taps to the transformer so that each socket is energized with voltage corresponding to the tube for which it is intended. The sockets are, of course, provided with appropriate indicia in such case.

Referring to Fig. 5, this is a simplified form of commercial tester which is provided with a multiplicity of separate test sockets numbered 68—91. Each of these test sockets is intended for a particular kind of tube and the indicia on the socket, such as "26" on socket 83, indicates that that socket is for a tube No. 226 or 326, or any tube of the same type. The sockets 68—91 have their contacts connected by suitable conductors, to the secondary windings of a transformer 10, so that the socket contacts are suitably energized for each particular type of tube.

The sockets 92, 93 are auxiliary sockets not yet connected in a circuit, but adapted to be utilized by the owner of the testing device when new tubes appear on the market. In such case the tester may be returned to the factory and suitable connections added to properly energize the sockets 92 and 93, thereby preventing the apparatus from becoming obsolete.

It will be observed that certain of the sockets are provided with suitable connections and connectors 94—98 for permitting the connection of screen grid tubes or pentode tubes in the circuit, and each type of modern tube may be tested by means of the present testing device.

Other elements of the circuit which are similar to those of Fig. 1 have been given corresponding indicia and since Fig. 1 has been explained in detail, the detailed enumeration of all of the conductors of the complex circuit is not considered necessary. The circuit preferably includes a fuse 94 of suitable characteristics to protect the instrument and circuits, such as for example, a two ampere fuse. The meters 40 and 43 may be similar in construction and operation to those previously described.

The shunt selector switch 65 is shown as a rotary switch having a multiplicity of contacts 95 and shunts 66. In some embodiments of the invention it will be found that for certain tubes the shunts 66 will differ only very slightly, and in some of the cheaper embodiments of the invention suitable accuracy may be secured by grouping various of the socket connections and connecting them to use the same shunts.

It will be evident that this will be possible where the shunts would differ only very slightly, but it will result in a slightly lower degree of accuracy and the highest degree of accuracy can only be attained by having the proper shunt value for the meter for every different value of mutual conductance.

The instrument preferably includes an A. C. voltmeter 96, which is connected by conductors 97, 98 across the filament leads and, of course, the various sockets 68—91 are energized through common bus conductors wherever possible. The switch arms 36, 57 are preferably connected by an insulating block 99 and adapted to be actuated by a common push button 100.

The adjustable rheostat 101 has a movable contact arm 102 and is placed in series with the line conductor 11 to effect a line voltage adjustment. The adjustable rheostat 62 has a movable contact arm 63 and is provided to effect the zero reset adjustment by means of which the current in the meter 40 is reduced to zero.

The testing device is preferably provided with a plurality of auxiliary sockets 103—107 for the purpose of receiving tubes during a preheating operation and to permit the short circuit test of the tubes. The socket 104 is an ordinary four contact socket for short circuit tests of that type of tubes, while the sockets 105—107 are intended for both the short circuit test and preheating.

From point of view of the energization of these sockets, it will be understood that the contacts are connected by suitable conductors to the windings of the secondary of transformer 10 to energize sockets 104—107 at a voltage which is suitable for preheating the filaments of the tubes which the sockets will receive.

The secondary winding 108 is the filament energizing winding and it is connected by conductors 109, 110 to the various filament contacts of sockets 106, 107 in parallel.

The conductor 110 is connected to both the filament contacts of sockets 104 and 105, which are used for tubes needing no preheating, but only the short circuit test. Furthermore, the tying together of the filament contacts of the sockets 104, 105 insures a short circuit test from the filament to the other electrodes, whether the filament be broken or not, because both sides of the filament are connected together. If the filament is actually broken no indication will be secured when the tube is given the characteristic test in the test sockets 68—91.

The testing device is preferably provided with a plurality of small lamps 111—114 for the purpose of indicating short circuits and with a pilot lamp 115 for indicating the energization of the device. The secondary winding 116 has one end connected to the secondary winding 108 and the opposite end connected by a conductor 117 to one contact of the socket of the short circuit lamp 112. The other terminal of lamp 112 is connected by conductor 118 to the cathode contacts of sockets 105—107.

It will thus be observed that the lamp 112 is in series with a circuit which includes the one side of the filament, the cathode and secondary winding 116, and if there is a short circuit between the cathode and filament the lamp 112 will be lighted to full brilliancy, since the winding 116 is provided with a sufficient number of turns to provide a voltage appropriate for the lamp 112.

In some embodiments of the invention the same energizing secondary winding may be utilized for different short circuit lamps, but in such case the lamps will not be lit to full brilliancy when there are several different lamps lit, or several short circuits in the tube. I prefer to provide an energizing secondary winding for each of the short circuit lamps, so that the lamps will be lit to full brilliancy, thereby giving a positive indication of each type of short circuit and leaving no doubt as to the character of the defect in the tube.

The secondary winding 119 is connected by a conductor 120 to the conductor 118 which leads to the cathode contacts. The opposite end of the winding 119 is connected by conductor 121 to lamp 114 and the opposite terminal of lamp 114 is connected by conductor 122 to a screen grid connector 123. The screen grid connector 123 is used with an auxiliary lead to make a connection with the control grid contact which is usually at the top of a screen grid tube.

The winding 124 has one end connected by conductor 125 to the conductor 122 and the other end is connected by a conductor 126 to lamp 113. The other terminal of lamp 113 is connected by conductor 127 to the grid contacts or sockets 105—107.

The winding 128 has one end connected by a conductor 129 to the conductor 127, which leads to the grid contacts of sockets 104—107. The other end of winding 128 is connected by conductor 130 to lamp 111, the other terminal of which is connected by conductor 131 to the plate contacts of sockets 104—107.

Each of the lamps 111—114 bear appropriate indicia such as numbers or words designating the type of short circuit the lamps are intended to indicate. The pilot light 115 is connected by conductors 132, 133 to the opposite sides of a filament circuit. The pilot lamp 115 indicates to the user that the testing device is energized and serves to remind the used to de-energize the testing device when he has finished using it.

The present short circuit testing feature may be embodied in any of the testers shown in the wiring diagrams, although the short circuit diagram is not included in each figure. The short circuit test and preheater circuits may be energized from a separate transformer because there is no need to adjust the line voltage on these devices, and it may be preferable to use a separate transformer, since this reduces the duty on the rheostat used for line voltage adjustment.

Referring to Fig. 6, this is a wiring diagram of a modified form of tester which embodies the features of the tester described with respect to Fig. 1, and other improved features. The meters, switches, circuits and other electrical elements which perform the same functions have been given the same numerals as were used in Fig. 1, and the fundamental principle of operation of the tester of Fig. 6 is similar to that of Fig. 1.

The tester of Fig. 6 may therefore be described with reference to Fig. 1, by pointing out the points of difference and the additional features which have been embodied in this modification.

Instead of employing a separate socket for each different type of tube, as shown in Fig. 5, the tester of Fig. 6 employs two sockets 68, 69, and a suitable number of selector switches for changing the characteristics of the electrical circuit for each different kind of tube. The plate voltage selector is the uppermost selector switch which is provided with a movable contact arm 134 for engaging a multiplicity of fixed contacts 135 preferably arranged in a circle.

The selector switches are preferably rotary switches in order to facilitate the provision of a multiplicity of different contacts at a minimum expense. The movable contact arm 134 is connected by a conductor 136 to conductor 137 which leads to the plate contacts of both sockets, as will be described in detail herein. The fixed contacts 135 are connected by a plurality of suitable leads 138—140 to suitable taps on the secondary winding 141, so as to provide different plate voltages on the different fixed contacts 135.

It should be understood that many different type tubes require the same plate voltage and therefore it is not necessary to have a separate tap for each fixed contact, but many of the fixed contacts of the plate voltage selector switch may be tied together.

The circuit to the plate contacts of sockets 68, 69 is completed through the meter 40 and switch 36 in a similar manner to the circuits described in Fig. 1. Switch 36 is connected by conductor 142 to resistances 143, 144. Resistance 144 is connected by conductor 145 to a protective resistance 146, which is connected by conductor 147 to the plate contact of socket 69. Conductor 147 is connected to a resilient switch arm 148, which is normally urged into engagement with a fixed contact 149 which is connected by a conductor 150 to the plate contact of socket 68.

The grid contact of socket 68 is connected by conductor 151 to a fixed contact 152, which is adapted to be engaged by a resilient movable contact 153. The movable contact 153 is connected to a conductor 154 which also leads to the grid contact of socket 69. Switch arm 153 is normally urged into engagement with the fixed contact 152 and the two switches 148, 153 are joined together by an insulating block 155 in such manner that they may be simultaneously actuated by the same push button 156.

The push button 156 is thus adapted to break the normal plate circuit of the socket 68 and to substitute the connection to the grid contact for the normal plate connection to facilitate the test of double plate rectifier tubes. Push button 156 is therefore designated with suitable indicia signifying it is for test of the second plate.

The second selector switch from the top is the meter shunt selector switch which is provided with a movable contact arm 157 adapted to engage any of a multiplicity of fixed contacts 158 arranged in a circle. Each of the fixed contacts 158 is connected to a different meter shunt for the meters 40, 43 particularly the latter since the former meter is only returned to zero and merely indicates that the normal plate current effect in the meter circuit has been nullified.

As previously described, these shunts may differ very slightly in the case of some tubes, and in such case the shunts may sometimes be grouped so that a single shunt may take care of several different switch positions. The more accurate results are, however, obtained by using a separate shunt for each particular value of mutual conductance so that the meter 43 will indicate the same for all types of tubes which have the same worth or efficiency.

The shunts 159 are placed in parallel with the meter 43 and therefore one end of each of the shunts is connected by conductors 160, 137, 161, to one side of the meters 43, 40. The rotary switch arm 157 is connected by conductors 162 to conductor 145, which leads through resistance 144, conductor 142 and switch 36 to the other side of meter 43.

It will thus be observed that the meter shunt selector is adapted to select a proper shunt to make the "single standard" meter give a similar indication for different types of normal tubes.

The third selector switch from the top is the cathode voltage selector which is provided with a movable contact arm 163 and a plurality of fixed contacts 164. The fixed contacts 164 are connected by suitable conductors 165—169 to suitable points in the alternating current network or secondary windings, to provide proper cathode voltages for the various types of tubes. The movable contact arm 163 is connected by conductor 170 to the cathode contact of socket 69.

The fourth selector switch from the top is the grid voltage selector which is provided with a movable contact arm 171 and a multiplicity of fixed contacts 172. The fixed contacts 172 are connected by conductors 173—179 to suitable points in the alternating current network or to the secondary windings to provide the proper grid voltage at the contacts 172 for each of the various types of tubes to be tested.

The grid voltage selector arm 171 is connected by a conductor 180 and conductor 154 to the grid of socket 69. Through the conductors 154, 153, 152 and 151 it is also connected to the grid contact of socket 68.

The lowermost selector switch is the filament voltage selector which is provided with a movable contact arm 181 and a plurality of fixed contacts 182. The fixed contacts 182 are connected by suitable conductors 183—190 to suitable points in the alternating current network and the secondary windings to energize the contacts 182 with the appropriate filament voltage for each different type of tube.

The filament voltage selector arm 181 is connected by conductor 191 to the right hand filament contact of each socket. The left hand filament contact of each socket is connected by conductor 192 to the opposite end of the secondary winding. The normal filament voltage and proper line voltage is indicated by an alternating current voltage meter 193, the terminals of which are connected by conductors 194, 195 to conductors 188, 189.

The meter 193 does not indicate in any units the filament voltage, but when its pointer is at a predetermined point the input transformer voltage is so adjusted that all of the circuit voltages will be correct for the various tubes.

In order to adjust the line voltage the transformer is provided with a series rheostat 196 having an adjustable contact arm 197, and the use of a scale having a single mark on the meter 193 shows that the testing device is properly adjusted for a test without the necessity for giving any other attention to the adjustment of the tester except the placing of the selector switches in a proper position for the tube to be tested.

If desired, the selector switch arms 134, 157, 163, 171, 181, might be provided with separate actuating members and separate indicia, but they are preferably all mounted on a single shaft and adapted to be actuated by the same actuating member with a single dial and a pointer for indicating the proper position for each tube.

Thus the numerals inside the circle of contacts 182 of the filament voltage selector are the type numbers for various types of tubes and the switch casing or panel which supports the selector switches is provided with indicia of this type to indicate the selector switch setting for each tube. It will thus be observed that the number of sockets necessary for testing different types of tubes may be reduced to the two standard types of four contact and five contact sockets by the use of rotary selector switches for plate voltage, cathode voltage, grid voltage and filament voltage.

The control grid of a screen grid tube is connected to the cap at the top of the tube, and therefore it is necessary to provide circuits whereby the connection to the top of the screen grid tube is made instead of the connection to the ordinary grid prong of the ordinary type of tube. When testing a screen grid tube the screen grid connectors 198, 199 are connected by a conductor 200 to the conductor 179, which is connected by conductor 173 to all of the grid voltage selector contacts. A conductor 179 leads to the fixed contact 55 of the grid shift switch 57, and the same push button 100 may be used for changing the control grid voltage in a test of a screen grid tube or for changing the grid voltage in a test on an ordinary tube. For the purpose of distinguishing between the ordinary tubes and screen grid tubes, the grid which is connected to the cap of the screen grid tube will be called a "control grid", while the grid of an ordinary tube which is connected to the usual prong will be called the "normal" grid, although both of these grids are used as control grids.

The operation of the tester of Fig. 6 is substantially the same in principle as that of Fig. 1. After the tube has been checked for a short circuit and preheated, if necessary, the rotary selector switch is turned to the corresponding number of the tube, such as the position "'26" for a 226 tube. The selector switch must always be placed in the proper position before a tube is inserted in the socket so that the socket is energized with the appropriate voltage for that tube. If the tube were placed in the socket first, the selector switch might pass through some position in which too much voltage would be applied to the tube, and the tube would be burned out. Consequently, care must be taken to adjust the device properly for that type of tube before the tube is placed in the socket. The tube is then placed in the appropriate socket 68 or 69, and it is immediately energized through the circuits of the tester. The line voltage is adjusted by means of the rheostat 196 until meter 193 reads on zero, and the neutralizing current is then adjusted by means of rheostat 62, 63 until meter 40 reads at zero or some other predetermined point.

The push button 100 may then be pressed and the meter 43 will indicate whether the tube is good or bad or doubtful.

Referring to Fig. 7, this is a wiring diagram of a modified testing device which is capable of accomplishing the same result by a different circuit. The uppermost, the third, fourth and fifth selector switches are similar in construction and wiring to those previously described with respect to Fig. 6, thereby providing the tube under test with the proper plate voltage, the proper cathode voltage, the proper grid voltage and the proper filament voltage.

It is desired to cause the same meter to give a similar deflection for tubes of different types and in the embodiment of Fig. 6 this has been accomplished by the use of a shunt selector switch which changes the amount of current passing through the meter, giving an equal scale deflection for different tubes of the same efficiency or value.

Since different types of tubes have a different mutual conductance and the mutual conductance bears a relation to the change in grid voltage, the indication of the characteristics of the tubes may be made the same for different types of tubes by providing a different increment of grid voltage for each different type of tube. The second bank of switch contacts from the top in Fig. 7 are those of a grid shift selector which is intended to place different increments of grid voltage on different types of tube so that the scale deflection of a good tube on the meter 43 will be the same irrespective of the type of tube.

Thus the grid shift selector switch is provided with a movable contact arm 201 and with a plurality of fixed contacts 202. The fixed contacts 202 are connected to various points in a resistor 203 so that various increments of grid voltage are inserted in the grid circuit when the contact on 201 takes different positions. The resistor 203 is connected at one end by conductor 204 to the fixed grid shift contact 53, and at the other end by conductor 205 to the same contact.

The resistance 203 thus constitutes a multi-contact potentiometer which is adapted to provide different increments of voltage for the grid shift test on each different type of tube. It should be understood that while the contacts 202 appear to be connected to the resistor 203 in such manner as to provide constantly increasing increments of resistance, the connections to the resistance are such that each contact is energized with an appropriate voltage for each different type of tube, the increment of voltage for the grid shift test being sufficient to give a standard indication on the meter 43.

Referring to Fig. 8, this is a modified form of testing device employing a limited number of sockets 206—213 and a rotary selector switch 214 for selecting the proper tube socket. The other selector switches are the meter shunt selector, the cathode voltage selector, the grid voltage selector and the filament voltage selector.

Any of the devices described herein may also be provided with a push button switch adapted to be used in testing the other plate of rectifier tubes. The push button 155 of Fig. 7 is thus adapted to cut out the normal plate from the plate circuit and to insert in the plate circuit of the testing device the other plate element of the rectifier tube which is ordinarily connected to the contact corresponding to the grid of a three element tube.

In testing rectifier tubes, it is not necessary to measure any amplifying characteristic of the tube, but it is the rectifying property of the tube which is to be measured. Consequently, it is desired to measure the full plate current rather than a change in the plate current. The switch 220 changes the connections to the meter so that the meter is provided with a shunt adapting the meter to measure the large total net plate current, and the switch 220 also disconnects from the circuit the parallel circuit of opposed polarity, which might be termed the "neutralizing" or "bucking out" circuit. When push button 220 is pressed the meter will give an indication of the total plate current of one plate, and when both the buttons 220 and 156 are pressed the meter will indicate the total plate current of the other plate of a rectifier tube.

The device of Fig. 8 is adapted to apply the several voltages to any one of a group of sockets, so that the tube in any socket may be tested by turning the socket selector switch to the corresponding position. The selector switches are preferably actuated by a common actuating member.

It will thus be observed that I have invented an improved tube testing device which is adapted to indicate to the customer in ordinary language whether the tube is good or bad or whether it lies in the doubtful range in between a good tube and a worthless tube.

The present tube tester is adapted to test all the modern types of tubes with a minimum of adjustment or manipulation on the part of the user or dealer so that the confidence of the customer is greatly increased and the present testing system tends to allay suspicion that the dealer is manipulating the tube tester to his own benefit.

The tubes may be tested without the necessity for the use of any standard charts and no mental calculations of any kind are necessary, so that the test may be understood by the ordinary purchaser of tubes and he may rely upon the integrity of the manufacturer of the testing device, who has no interest other than the provision of a device for carrying out the testing of the tubes efficiently and accurately.

Figure 9:
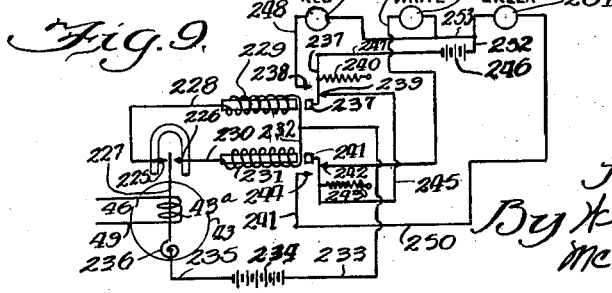
Fig. 9 is a wiring diagram of a relay circuit and signaling system which may be substituted for the meter 43 so as to give the indication of the worth of the tube by means of colored lights.

Referring to Fig. 9, this is a wiring diagram of a signaling system, including a relay and lamps, which may be substituted for the meter 43 in any of the embodiments previously described. The conductors 46 and 49 are thus the same conductors which lead to the meter 43 in Fig. 1. The member 43A comprises a relay of the instrument type, which is provided with a pair of fixed contacts 225, 226 adapted to be engaged by the movable switch arm 227.

The fixed contact 225 is connected by a conductor 228 to one end of the coils of an electromagnet or relay 229, while the fixed contact 226 is connected by a conductor 230 to a corresponding end of another electromagnet or relay 231. The common terminal 232 of the relay coils 229 and 231 is connected by conductor 233 to a series of electrical force such as 234, the other end of the terminal of the battery being connected by a conductor 235 is connected to the movable switch arm through the spring 236.

The relay 229 is provided with an armature 237 which is adapted to engage the fixed contacts 238, 239. The armature 237 is urged into engagement with fixed contact 239 by a spring 240, but is drawn into engagement with contact 238 when coil 229 is energized. The armature 241 is likewise urged into engagement with fixed contact 242 by spring 243, but may be drawn into engagement with contact 244 when coil 231 is energized. Armature 241 is connected to fixed contact 239 by conductor 245. Armature 237 is connected to a source of electromotive force such as a battery 246 by conductor 247. Fixed contact 238 is connected by a conductor 248 to the terminals of a red signal lamp 249, and fixed contact 244 is connected by conductor 250 to the terminal of a green signal lamp 251. The other terminal of the green signal lamp may be connected by conductor 252 to the other terminal of the battery 246, and a conductor 253 leads from the other terminal of lamp 249 to conductor 252. One terminal of the white signal lamp 254 is connected to conductor 253, while the other terminal is connected by conductor 255 to the fixed contact 242.

The colors which have been selected for the lamps are merely exemplary of a few of the many colors which may be used, but are preferred on account of the significance which has already been given such colors in traffic signals. The illumination of the red signal lamp means that it is a bad tube, the white signal lamp doubtful, while the green signal lamp indicates that it is a good tube. If desired, the casing or support for the lamps may also be provided with additional indicia, such as "bad" above the red lamp, "doubtful" above the white lamp, and "O. K." above the green lamp.

The present signaling system may be substituted for meter 43 in any of the embodiments of the invention described, and the operation of the signaling system is as follows:

The instrument type relay 43A has the same characteristics as the meter 43 previously described, and when a tube is in the doubtful classification the switch arm 227 will assume a central position without engaging either the contacts 225, 226, as shown in Fig. 9. Under these conditions, the white signal lamp will be energized through the following circuits: 254, 253, 252, 246, 237, 239, 245, 241, 242, 255, 254.

When the characteristics of the tube are such as to give a predetermined deflection of the switch arm 227 toward the left, so as to classify the tube as a bad tube, the switch arm 227 will engage contact 225 and coil 229 will be energized, and the armature 237 will be drawn into engagement with contact 238. This will de-energize the white lamp and close the circuit to the red lamp, which indicates that the tube is bad.

When the characteristics of the tube are such as to give a predetermined deflection toward the right, the switch arm 227 engages contact 226, energizing coils 231, and the armature 241 is drawn into engagement with contact 244. This also serves to de-energize the white lamp and close the circuit to the green lamp, indicating that the tube is good.

It will thus be observed that the present signaling system may be used to indicate by means of lamps the worth of any of a number of different types of tubes, and it is unnecessary for the purchaser of tubes to rely upon the statement of the tube dealer, but he may rely upon the integrity of the manufacturer of the tube testing device, who has no interest other than the accurate test of tubes. The present signaling system gives a very simple indication which is readily understood by all purchasers of tubes. This tends to gain the confidence of the purchaser and promote the sale of tubes by dealers using such a testing device.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by United States Letters Patent is:

In a testing device for vacuum tubes, the combination of means for energizing predetermined electrodes of a tube, with a plurality of indicating lamps connected in circuit to be energized whenever predetermined electrodes of the tube are short-circuited, said energizing means including separate energizing means for each lamp.

HAROLD L. OLESEN.